United States Patent
Huberty et al.

(10) Patent No.: US 11,822,480 B2
(45) Date of Patent: Nov. 21, 2023

(54) CRITICALITY-INFORMED CACHING POLICIES

(71) Applicant: Apple Inc., Cupertino, CA (US)

(72) Inventors: Tyler J. Huberty, Sunnyvale, CA (US); Vivek Venkatraman, Santa Clara, CA (US); Sandeep Gupta, Santa Clara, CA (US); Eric J. Furbish, Austin, TX (US); Srinivasa Rangan Sridharan, Santa Clara, CA (US); Stephan G. Meier, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/727,020

(22) Filed: Apr. 22, 2022

(65) Prior Publication Data
US 2023/0066236 A1   Mar. 2, 2023

Related U.S. Application Data

(60) Provisional application No. 63/239,258, filed on Aug. 31, 2021.

(51) Int. Cl.
*G06F 12/0891*  (2016.01)
*G06F 12/0862*  (2016.01)
(Continued)

(52) U.S. Cl.
CPC ........ *G06F 12/0891* (2013.01); *G06F 9/3877* (2013.01); *G06F 12/0292* (2013.01);
(Continued)

(58) Field of Classification Search
CPC ............... G06F 9/3877; G06F 12/0292; G06F 12/0833; G06F 12/0862; G06F 12/0891; G06F 12/126; G06F 2212/1021
See application file for complete search history.

(56) References Cited

U.S. PATENT DOCUMENTS 8,615,634 B2   12/2013   Daly et al.
8,990,506 B2   3/2015    Cherukuri et al.
(Continued)

FOREIGN PATENT DOCUMENTS

| KR | 10-2015-0079413 A | 7/2015 |
| TW | I628541 B | 7/2018 |
| TW | I688859 B | 3/2020 |

OTHER PUBLICATIONS

Samantika Subramaniam Anne Bracyy Hong Wangy Gabriel H. Loh; "Criticality-Based Optimizations for Efficient Load Processing"; Georgia Institute of Technology & Intel Corporation, College of Computing Microarchitecture Research Laboratory, Atlanta, GA, USA Santa Clara, CA, USA fsamantik,lohg@cc.gatech.edu fanne.c.bracy,hong.wangg@intel.com, in the proceedings of the 35th ACM/IEEE International Conference on High-Performance Computer Architecture, Feb. 2009, 12 pages.
(Continued)

*Primary Examiner* — Aracelis Ruiz
(74) *Attorney, Agent, or Firm* — Kowert, Hood, Munyon, Rankin & Goetzel, P.C.

(57) ABSTRACT

A cache may store critical cache lines and non-critical cache lines, and may attempt to retain critical cache lines in the cache by, for example, favoring the critical cache lines in replacement data updates, retaining the critical cache lines with a certain probability when victim cache blocks are being selected, etc. Criticality values may be retained at various levels of the cache hierarchy. Additionally, accelerated eviction may be employed if the threads previously accessing the critical cache blocks are viewed as dead.

20 Claims, 13 Drawing Sheets

(51) Int. Cl.
*G06F 9/38* (2018.01)
*G06F 12/126* (2016.01)
*G06F 12/02* (2006.01)
*G06F 12/0831* (2016.01)

(52) U.S. Cl.
CPC ...... *G06F 12/0833* (2013.01); *G06F 12/0862* (2013.01); *G06F 12/126* (2013.01); *G06F 2212/1021* (2013.01)

(56) References Cited

U.S. PATENT DOCUMENTS

| | | | |
|---|---|---|---|
| 10,289,558 B2 | 5/2019 | Kamruzzaman | |
| 10,846,241 B2 | 11/2020 | Zaydman | |
| 2002/0013887 A1* | 1/2002 | Ting | G06F 12/121 711/E12.07 |
| 2009/0204764 A1 | 8/2009 | Larson et al. | |
| 2011/0145506 A1 | 6/2011 | Cherukuri et al. | |
| 2012/0203968 A1 | 8/2012 | Daly et al. | |
| 2013/0151777 A1 | 6/2013 | Daly et al. | |
| 2016/0255169 A1* | 9/2016 | Kovvuri | G06F 12/126 709/219 |
| 2017/0060633 A1 | 3/2017 | Suarez et al. | |
| 2017/0337133 A1* | 11/2017 | Bolbenes | G06F 12/126 |
| 2018/0004661 A1 | 1/2018 | Umehara et al. | |
| 2019/0018798 A1 | 1/2019 | Al Sheikh et al. | |
| 2021/0390053 A1 | 12/2021 | Roberts | |
| 2021/0406170 A1 | 12/2021 | Jung et al. | |

OTHER PUBLICATIONS

Srikanth T. Srinivasan, Roy Dz-ching Ju, Alvin R. Lebeck, Chris Wilkerson; "Locality vs. Criticality"; Department of Computer Science, Microprocessor Research Labs, Duke University Intel Corporation fsri, alvyg@cs.duke.edu froy.ju, chris.wilkersong@intel. com; Appears in Proceedings of the 28th International Symposium on Computer Architecture, Jun. 2001. Copyright IEEE 2001, 13 pages.

Samira Khany, samirakhan@cmu.edu, Alaa R. Alameldeen, alaa.r. alameldeen@intel.com, Chris Wilkerson,chris.wilkerson@intel. com, Onur Mutluy onur@cmu.edu, Daniel A. Jim'enezz djimenez@cs. tamu.edu; "Improving Cache Performance by Exploiting Read-Write Disparity"; Carnegie Mellon University, Intel Labs, Texas A&M University, Date of Conference: Feb. 15-19, 2014; Date Added to IEEE Xplore: Jun. 19, 2014; Electronic ISBN:978-1-4799-3097-5; 12 pages.

U.S. Appl. No. 17/727,031, filed Apr. 22, 2022.

International Search Report and Written Opinion in PCT Appl. No. PCT/US2022/038712 dated Nov. 17, 2022, 11 pages.

Office Action in U.S. Appl. No. 17/727,031 dated Apr. 7, 2023, 10 pages.

Office Action in Taiwanese Appl. No. 111132878 dated Jun. 6, 2023, 12 pages.

Office Action in U.S. Appl. No. 17/727,031 dated Aug. 11, 2023, 12 pages.

* cited by examiner

| | Request Type | Previous State | Criticality | LRU |
|---|---|---|---|---|
| Insert 64 | Data Prefetch | Null | Non-critical | N (near LRU) |
| | Data Prefetch | Null | Critical | MRU |
| | Instruction Prefetch | Null | Non-critical | N (near LRU) |
| | Instruction Prefetch | Null | Critical | MRU |
| | I/D Demand Fetch | Null | Non-critical | L (near middle) |
| | I/D Demand Fetch | Null | Critical | MRU |
| | NT Demand | Null | N/A | M (<N near LRU) |
| Update 66 | I/D Demand Fetch | Data Prefetch | N/A | NC, unset PF |
| | I/D Demand Fetch | NT Demand | N/A | MRU |
| | I/D Demand Fetch | I/D Demand Fetch | N/A | MRU |
| | Data Prefetch | NT/DPF/Demand | N/A | N (near LRU) |
| | Instruction Prefetch | NT/DPF/Demand | N/A | MRU |
| | NT Demand | NT/DPF/Demand | N/A | M (<N near LRU) |

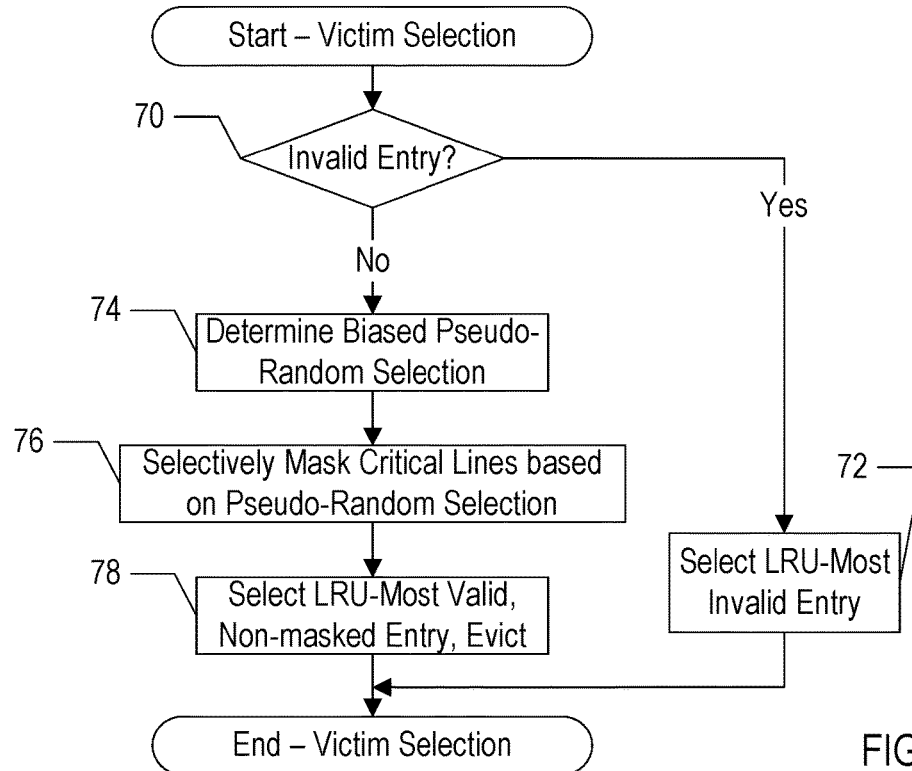

FIG. 4

CRITICALITY-INFORMED CACHING POLICIES

This application claims benefit of priority to U.S. Provisional Patent Application Ser. No. 63/239,258, filed on Aug. 31, 2021. The above application is incorporated herein by reference in its entirety. To the extent that the incorporated material conflicts with the material expressly set forth herein, the expressly set forth material controls.

BACKGROUND

Technical Field

Embodiments described herein are related to caches in computer systems and, more particularly, to caching policies.

Description of the Related Art

Caches have long been employed in digital systems to reduce effective memory latency by capturing a copy of data that has been accessed by a processor, coprocessor, or other digital device in a cache memory local to the device. The cache memory can be smaller than the main memory system and can be optimized for low latency (whereas the main memory system is often optimized for storage density at some expense to latency). Accordingly, the cache memory itself can reduce latency. Additionally, the cache memory can be local to the device, and thus latency can be reduced because the transportation delay to the memory controller/main memory system and back to the device is not incurred. Furthermore, the cache can be private to the device or a small number of devices (e.g., a processor/coprocessor cluster) and thus the competition for bandwidth to the cache may be reduced as compared to main memory.

While caches reduce effective memory latency, they are finite storage and therefore are subject to miss (which causes a fill from the memory to the cache to obtain the data, in addition to providing the data to the requesting device if the miss is for a read request or making the update if the miss is for a write request). The fill is allocated storage in the cache (e.g., a cache line or cache block). The allocation can cause other data to be replaced in the cache (also referred to as evicting a cache line from the cache). A variety of replacement policies exist to select the evicted cache line, based on the cache geometry. For example, set associative caches have a memory arranged as a two-dimensional array of cache lines: a "row" is selected based on a subset of the memory address of the cache line (referred to as a set), and the row includes a plurality of cache lines which are the "columns" of the array (referred to as ways). When a cache miss is detected and a fill is initiated, one of the ways is allocated for the fill. A popular replacement policy for set associative caches is the least recently used (LRU) policy. With LRU, accesses to the cache lines in a set are tracked from most recently accessed (most recently used, or MRU) to least recently accessed (least recently used, or LRU). Typically, when a cache line is accessed, it is updated to the MRU and the cache lines between the former ranking of the cache line and the previous MRU are adjusted. The LRU cache line can be selected for replacement when a cache miss occurs.

BRIEF DESCRIPTION OF THE DRAWINGS

The following detailed description refers to the accompanying drawings, which are now briefly described.

FIG. 3 is a table illustrating LRU insertion and update in one embodiment of a last level cache (LLC) shown in FIG. 1.

FIG. 4 is a flowchart illustrating one embodiment of victim selection in the LLC.

Figure 1:
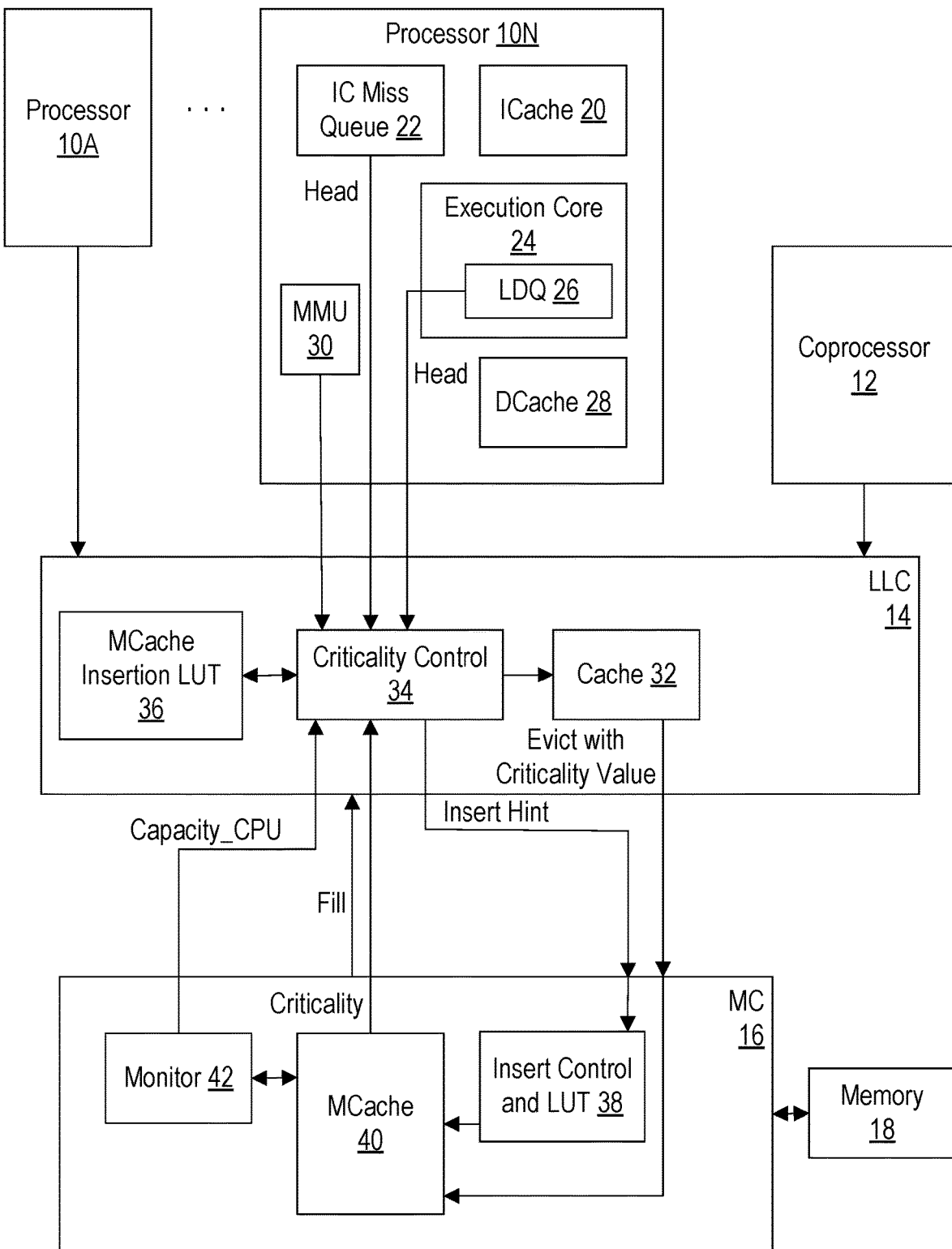
FIG. 1 is a block diagram of one embodiment of a portion a system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

While the LRU replacement policy often provides good performance (e.g., cache hit rates remain high and thus memory latency is reduced effectively), there are cases in which performance can be limited. For example, when competition for the cache lines is high and thus evictions are occurring frequently, some cache lines may be evicted which, when accessed again, cause a higher loss in performance of the requesting device than other cache lines. For example, if a number of operations in the requesting device depend on the data in the cache line, directly or indirectly through other operations, the requesting device may be stalled waiting on the data. Other cache lines with less dependencies may be less critical to performance. The LRU policy has no way to reflect the differences in criticality of cache lines.

In an embodiment, a system comprising one or more processors and a cache coupled to the one or more processors may categorize cache lines according to one or more levels of criticality based on one or more criteria measured at the time the cache lines are filled into the cache. The criteria may be selected to attempt to identify the cache lines that, when they are a miss in the cache, are a greater impact on the performance of the processors than other cache lines.

Each cache line may have a criticality value that specifies its level of criticality. For example, the critical value may indicate non-critical status or critical status. In an embodiment, the critical status may also have multiple levels of criticality as described in more detail below. In another embodiment, critical status may be a single level indicating critical, as opposed to the non-critical status.

The cache may implement a replacement policy that uses the criticality values of the cache lines as a factor. For example, an LRU policy may be used, but the policy may be modified to account for the criticality of various cache lines. Cache lines having a criticality value indicating critical status ("critical cache lines") may be inserted into the LRU replacement data at the MRU position, while cache lines having criticality values indicating non-critical status ("non-critical cache lines") may be inserted at lower positions in the data (e.g., closer to the LRU position). In an embodiment, criticality values may also impact the update of the LRU replacement data. While LRU is used as an example replacement policy, other embodiments may implement other replacement policies. For example, a variety of pseudo-LRU policies may be used, which approximate LRU operation by have simplifications to make the policy easier to implement, especially in wide set associative caches. Random replacement policies also may be used, and criticality may be used to reduce the likelihood that critical lines are selected. Least frequently used policies may be used, and critical lines may be selectively retained in a manner similar to that described below for LRU. Last in, first out or first in, first out policies may be used, and critical cache lines may be at least partially exempted from LIFO or FIFO replacement. Any of these policies may be modified to take criticality into account.

In an embodiment, the system may include one or more additional levels of cache between the above-mentioned cache and the system memory. For example, a memory cache implemented at the memory controller that controls the system memory may be used. The criticality values of cache lines may be exchanged among the caches as the cache lines are evicted and reaccessed, retaining the criticality values while the cache lines remain cached in the cache hierarchy. Once the cache line is removed from the cache hierarchy (and thus the data only exists in the system memory), the criticality value may be lost.

FIG. 1 is a block diagram of one embodiment of a system including a plurality of processors 10A-10N, a coprocessor 12, a last level cache (LLC) 14, a memory controller 16, and a memory 18. The processors 10A-10N and coprocessor 12 are coupled to the LLC 14, which is coupled to the memory controller 16, which is further coupled to the memory 18. The processor 10N is illustrated in greater detail, and other processors such as processor 10A may be similar. The processor 10N may include an instruction cache (ICache) 20, an instruction cache (IC) miss queue 22, an execution core 24 including a load queue (LDQ) 26, a data cache (DCache) 28 and a memory management unit (MMU) 30. The LLC 14 may include a cache 32, a criticality control circuit 34, and a memory cache (MCache) insertion lookup table (LUT) 36. The memory cache 16 may include an insert control circuit and LUT 38, an MCache 40, and a monitor circuit 42.

The ICache 20 may store instructions fetched by the processor 10N for execution by the execution core 24. If a fetch misses in the ICache 20, the fetch for the cache line of instructions may be queue in the IC miss queue 22 and transmitted to the LLC 14 as a fill request for the ICache 20. Instructions executed by the execution core 24 may include load instructions (more briefly, loads). The loads may attempt to read data from the DCache 28 and, in the case that a load misses in the DCache 28, may be transmitted to the LLC 14 as a fill request for the DCache 28. The loads transmitted to the LLC 14 may remain in the LDQ 26 awaiting data.

The MMU 30 may provide address translations for instruction fetch addresses and load/store addresses, including translation lookaside buffers (TLBs) that may be local to the ICache 20 and the execution core 24. The MMU 30 may optionally include one or more level 2 (L2) TLBs, as well as table walk circuitry to perform the translation table reads to obtain a translation for an address that misses in the TLBs. The MMU 30 may transmit the table walk reads to the LLC 14. In an embodiment, the MMU 30 may access the DCache 28 for potential cache hit on the table walk reads before transmitting to the LLC 14, and may not transmit the reads to the LLC 14 if they hit in the DCache 28. In other embodiments, page table data is not cached in the DCache 28 and the MMU 30 may transmit table walk reads to the LLC 14.

The LLC 14 includes the cache 32, which may have any capacity and configuration. Memory requests from the processors 10A-10N and the coprocessor 12 may be checked for a hit in the cache 32 and data may be returned as a fill to the ICache 20, the DCache 28, or the MMU 30 in the event of a hit. If the memory request is a miss in the cache 32, the LLC 14 may transmit a memory request to the memory controller 16 and may return the fill to the requesting processor 10A-10N or coprocessor 12 in response to the memory controller 16 returning a fill to the LLC 14. The LLC 14 may also fill the data into the cache 32 in the event of a miss. Generally, "data" is used herein in the generic sense to refer to both instructions fetched by the processors 10A-10N for execution and data read/written by the processors due to execution of the instructions (e.g., operand data and result data), particularly when referring to cache lines of data.

Additionally, at the time of the fill to the processor 10A-10N/coprocessor 12, the LLC 14 may assign a criticality value for the cache line. The criticality control circuit 34 may determine the criticality value and may update the cache 32 with the criticality value. For example, the cache tags in the cache 32 may include a field for the criticality value. The critical value may indicate non-critical status, or critical status. As mentioned above, in some embodiments, there may be more than one level of critical status. The criticality control circuit 34 may determine the level of critical status as well.

The criticality control circuit 34 may consider a variety of factors in assigning the criticality values to cache lines. For example, the criticality control circuit 34 is coupled to the MMU 30, the IC miss queue 22 and the LDQ 26. More particularly, fills that are for table walk requests may be categorized as critical. A TLB miss is likely to affect additional instruction fetches or load/store requests, since a translation covers a fairly large amount of data and code sequences tend to access data that is near other recently accessed data. For example, a page may be 4 kilobytes in size, 16 kilobytes in size, or even larger such as 1 Megabyte or 2 Megabytes. Any page size may be used. Additionally, if a load is at the head of the LDQ 26 when the fill for the load occurs, it may be the oldest load outstanding in the processor 10N. Thus, it is likely that the load is stalling the retirement of other completed instructions or there are a number of instructions stalled due to dependency on the load data (either direct or indirect). Fills for loads that are at the head of the LDQ 25 may be assigned critical status. Similarly, if a fill is for an instruction fetch request and it is the oldest fetch request in the IC miss queue 22 (e.g., it is at the head of the IC miss queue 22), then instruction fetching is likely to be stalled awaiting the instructions. Such instruction fetches may be assigned critical status. Other embodiments may include additional factors within a given processor 10A-10N, or subsets of the above factors and other factors, as desired. In an embodiment, requests from the coprocessor 12 may be assigned critical status as well. For example, an embodiment of the coprocessor 12 may not include a cache and thus the LLC 14 is the first level of caching available to the coprocessor 12. Cache lines not assigned critical status may be assigned non-critical status.

In an embodiment, the criticality values assigned to cache lines may be maintained while the cache lines remain valid in the cache hierarchy. The criticality value is assigned by the criticality control circuit 34, and then is propagated with the cache line when it is evicted from the cache 32 and transmitted to the memory controller 16, where it may be cached in the MCache 40. If the evicted cache line is placed in the MCache 40 after eviction from the cache 32, the criticality value may be maintained. If the evicted cache line is not placed in the MCache 40 after eviction from the cache 32, the memory controller 16 may drop the criticality value and write the data to the memory 18. There may be a variety of factors affecting whether or not an evicted cache line is cached in the MCache 40. The MCache 40 is shared with other components of the system, and the MCache 40 may have quotas for how much data can be cached from a given component. If the LLC 14 is over quota, the evicted cache line may not be cached. Alternatively, the evicted cache line may be cached, and a different LLC cache line cached in the MCache 40 may be evicted.

Subsequently, if a cache line previously cached by the LLC 14 is reaccessed by the LLC 14, the MCache 40 may provide the cache line as a fill to the cache 32, and the criticality value previously associated with the cache line may also be provided. The criticality control circuit 34 may assign the previous criticality value provided by the MCache 40 to the cache line, unless other factors from the processor 10A-10N that generated the reaccess of the cache line indicate an upgrade to critical status or to a higher level of critical status. For example, a non-critical cache line from the MCache 40 may be filled into the LLC 14 with non-critical status unless it is assigned critical status at the time of the fill for reaccess (e.g., the fill is for a load at head of the LDQ 26, an instruction fetch at the head of the IC miss queue 22, or a MMU tablewalk request). A critical cache line from the MCache 40 may be filled as critical. In embodiments that implement multiple levels of criticality status, a critical cache line from the MCache 40 that is also currently indicated as critical via the above factors (head of LDQ 26, head of IC miss queue 22, or MMU request) may be assigned a higher level of critical status by the criticality control circuit 34.

In an embodiment, evicted cache lines from the LLC 14 may be cached in the MCache 40 and may be inserted into the replacement data of the affected set of the MCache 40 at a selected position. If the evicted cache line is a critical cache line, it may be inserted at the MRU position. If the evicted cache line is a non-critical cache line, it may be inserted at a position that is lower than the MRU (closer to the LRU). In one embodiment, the insertion point may be dynamic for non-critical cache lines. For example, the insertion point may be based on the amount of cache capacity in the MCache 40 that is occupied by cache lines from the LLC 14. The memory controller 16 may include a monitor circuit 42 that monitors the capacity of the MCache 40 that is allocated to the CPU and provides the information ("Capacity_CPU") to the criticality control circuit 34. The criticality control circuit 34 may use the Capacity_CPU value as an index into the MCache Insertion LUT 36, and may read an insertion hint from the indexed entry when transmitting an evicted cache line to the memory controller 16. The insertion hint may be used as an index to a LUT 38 in the memory controller 16, and the associated insert control logic may potentially adjust the insertion point (e.g., if a portion of the cache is powered down, the insertion point should be within the currently in-use LRU positions). The MCache 40 may insert the evicted cache block at the insertion point.

Accordingly, in this embodiment, cooperative lookup tables may be used to determine the insertion point for evicted cache lines in the MCache 40, for non-critical cache lines. The LUTs may be programmable, allowing software to tune the performance as desired.

The Capacity_CPU value may be measured in any desired fashion. In an embodiment, the Capacity_CPU may indicate the number of MCache ways, on average, that are occupied by cache lines from the LLC 14. In another embodiment, an approximate percentage of the cache capacity may be provided.

As mentioned previously, the cache 32 may have a field (e.g., in the cache tag) for the criticality value. The MCache 40 may similarly include a field in the cache tag for the criticality value. In another embodiment, the MCache 40 may have a data set identifier (DSID) for each cache line, which identifies cache lines belonging together according to one or more criteria. Generally, cache blocks having the same DSID may be from the same source component (e.g., the LLC 14 or another component of the system such as a peripheral component, not shown in FIG. 1). The DSID may be stored in a field in the tag. The DSID may be used to distinguish non-critical and critical cache lines (e.g., by using one DSID for non-critical cache lines and another DSID for critical cache lines, or multiple DSIDs for different levels of critical status in embodiments that employ more levels of critical status). The MCache 40 may decode the DSID to determine the criticality value to transmit to the LLC 14 when providing a fill.

In an embodiment, the processors 10A-10N may serve as the central processing unit (CPU) of the system. The CPU of the system includes the processor(s) that execute the main control software of the system, such as an operating system. Generally, software executed by the CPU during use may control the other components of the system to realize the desired functionality of the system. The processors 10A-10N may also execute other software, such as application programs. The application programs may provide user functionality, and may rely on the operating system for lower-level device control, scheduling, memory management, etc. Accordingly, the processors 10A-10N may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC) or other levels of integration. Processors may further encompass discrete microprocessors, processor cores and/or microprocessors integrated into multichip module implementations, processors implemented as multiple integrated circuits, etc.

In an embodiment, the coprocessor 12 may be configured to accelerate certain operations. For example, an embodiment in which a coprocessor performs matrix and vector manipulations on a large scale (multiple operations per instruction) is contemplated. The coprocessor 12 may receive instructions transmitted by the processors 10A-10N. That is, the instructions executed by the coprocessor 12 ("coprocessor instructions") and the instructions executed by the processors 10A-10N ("processor instructions") may be part of the same instruction set architecture and may be intermingled in a code sequence fetched by the processor. The processor 10A-10N may decode the instructions and identify the coprocessor instructions for transmission to the coprocessor 12, and may execute processor instructions. The coprocessor 12 may receive the coprocessor instructions from the processor 10A-10N, decode coprocessor instructions, and execute the coprocessor instructions. The coprocessor instructions may include load/store instructions to read memory data for operands and write result data to memory (both of which may be completed in the LLC 14, in an embodiment).

It is noted that the number and type various components in the system of FIG. 1 may vary from embodiment to embodiment. For example, there may be any number of processors 10A-10N. There may be more than one coprocessor 12, and when multiple coprocessors are included there may be multiple instances of the same coprocessor and/or different types of coprocessors. There may be more than one memory controller 16, and when multiple memory controllers are included the memory space may be distributed over the memory controllers.

It is noted that various instructions, memory requests, etc. are referred to above as younger or older than other instructions, requests etc. A given operation may be younger than another operation if the given operation is derived from an instruction that is after the instruction from which the other operation is derived in program order. Similarly, a given operation is older than another operation if the given operation is derived from an instruction that is before the instruction from which the other operation is derived in program order.

Figure 2:
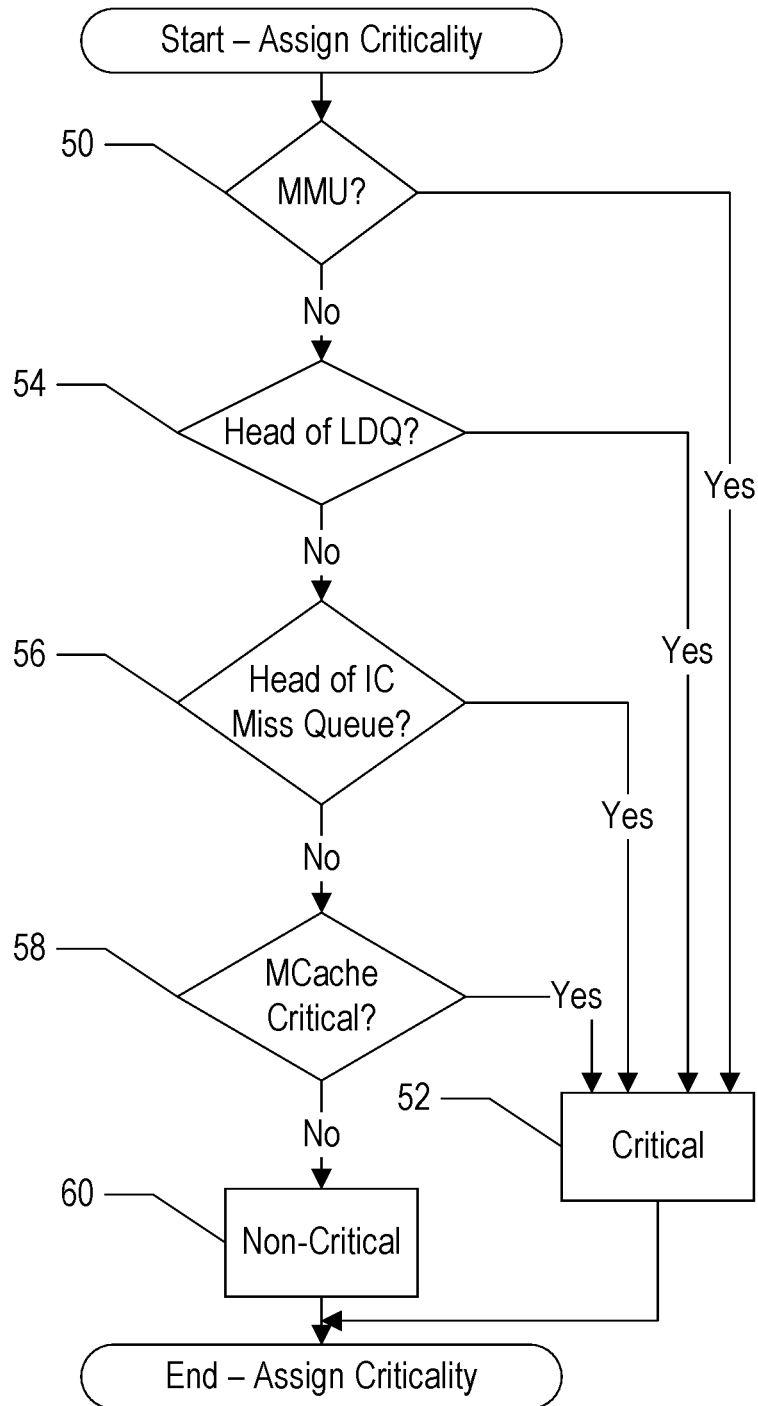
FIG. 2 is a flowchart illustrating criticality determination for one embodiment.
Figure 10:
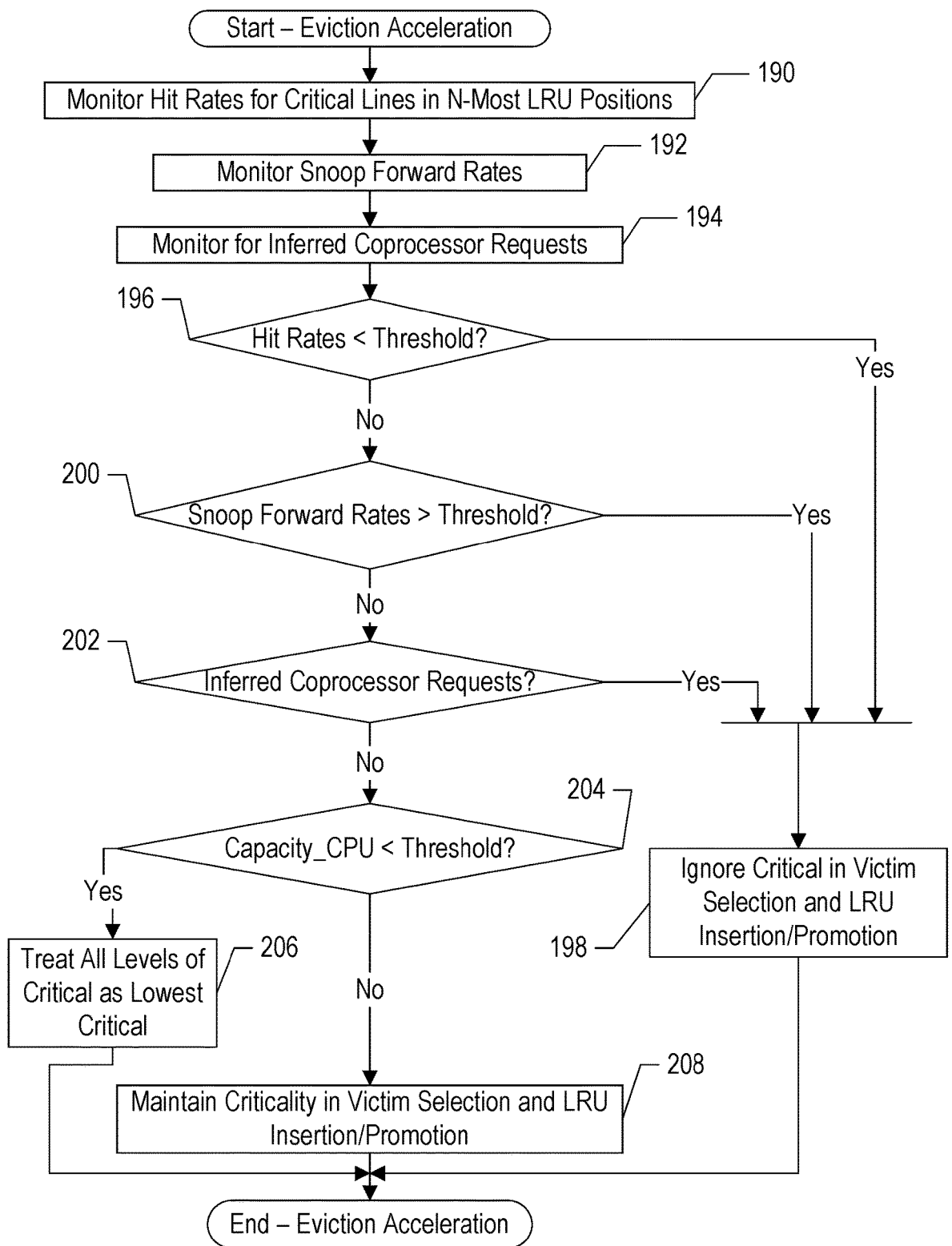
FIG. 10 is a flowchart illustrating eviction acceleration for cache lines marked as critical.
Figure 11:
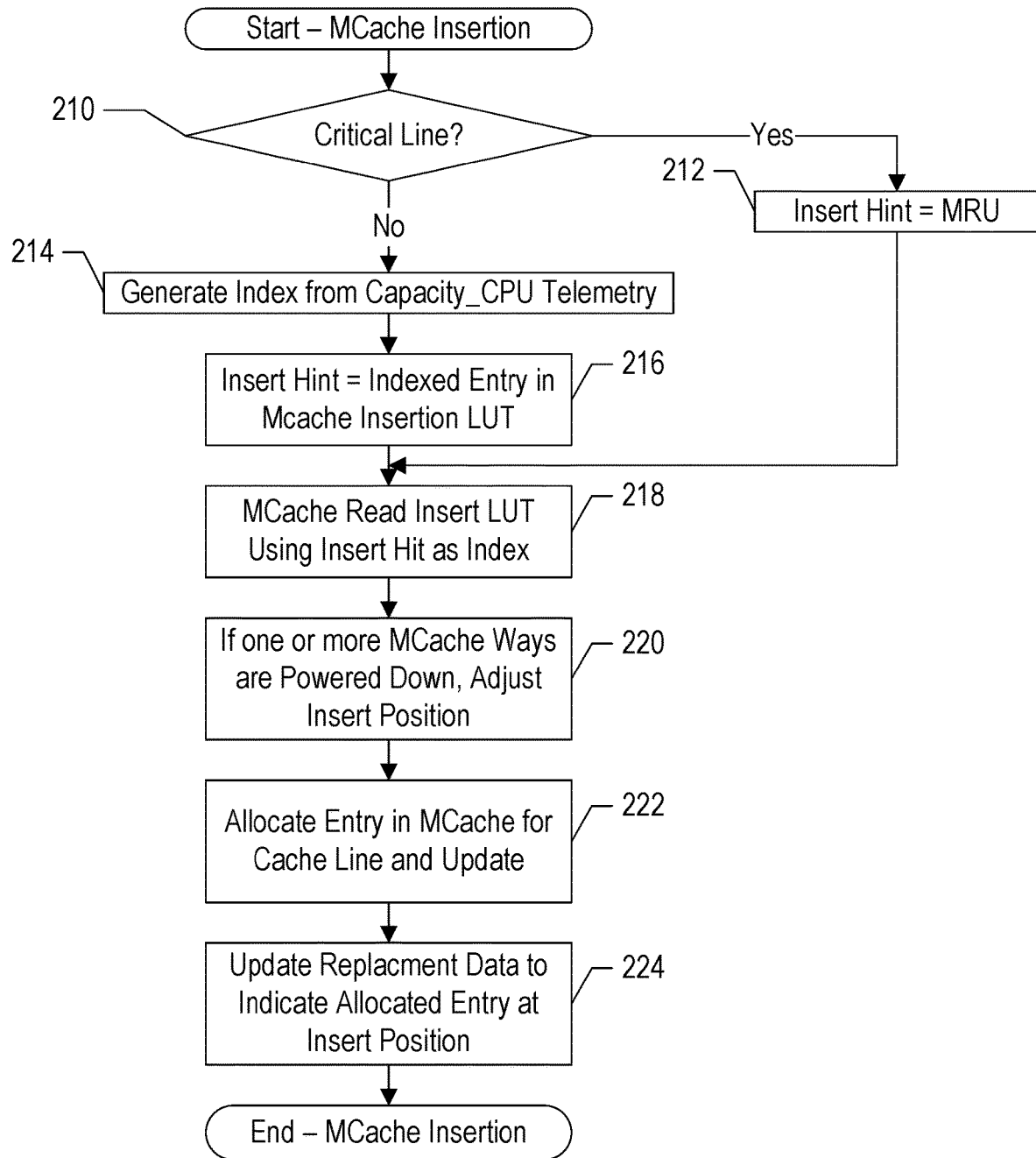
FIG. 11 is a flowchart illustrating LRU insertion for cache lines at the memory cache for one embodiment.

FIGS. 2-4 illustrate an embodiment in which criticality values are either critical or non-critical status. FIGS. 5-9 illustrate an embodiment in which critical status has more than one level of criticality. FIG. 10 illustrates a mechanism for accelerating the removal of critical cache lines from the LLC 14, for an embodiment, that may apply to both types of criticality values. FIG. 11 is a flowchart illustrating victim selection from the LLC 14 based on the acceleration mechanism of FIG. 10.

Turning now to FIG. 2, a flowchart is shown illustrating one embodiment of the criticality control circuit 34 to assign a criticality value for a cache line being filled into the LLC 14. While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 2.

If the fill is a cache line for an MMU tablewalk request (decision block 50, "yes" leg), the criticality control circuit 34 may assign critical status for the criticality value associated with the cache line (block 52). If the fill is a cache line for a load operation that is at the head of the LDQ 26 (decision block 54, "yes" leg), the criticality control circuit 34 may assign critical status for the criticality value associated with the cache line (block 52). If the fill is a cache line for an instruction cache miss that is at the head of the IC miss queue 22 (decision block 56, "yes" leg), the criticality control circuit 34 may assign critical status for the criticality value associated with the cache line (block 52). If the fill is a cache line having a critical status in the MCache (decision block 58, "yes" leg), the criticality control circuit 34 may assign critical status for the criticality value associated with the cache line (block 52). If none of the above criteria apply (decision blocks 50, 54, 56, 58, and 60, "no" legs), the criticality control circuit 34 may assign non-critical status for the criticality value associated with the cache line. In an embodiment, coprocessor requests from the coprocessor 12 may also be assigned critical status. In another embodiment, coprocessor requests may be assigned non-critical status.

FIG. 3 is a table 62 illustrating operation of one embodiment of criticality control circuit 34 for updating the replacement data for a set based on a fill of a cache line into the cache 32 (insert section 64) and based on a cache hit for a processor request from a processor 10A-10N (update section 66). The replacement data update may be based on request type, the previous state of the cache block, and the criticality value. The LRU column of the table indicates the position in the LRU ranking (from MRU to LRU) of the cache line being filled (in the insert section 64) or the cache line that is hit by a request (in the update section 66). Other cache lines in the set may be updated to reflect the change. For example, if the filled/hit cache line is made MRU, the position of each other cache line from the current MRU to the previous position of the filled/hit cache line may be moved one position toward the LRU. If the filled/hit cache line is moved to a different position in the replacement data than the MRU, each cache line having a position from the different position to the current position of the filled/hit cache line may be moved one position toward the LRU.

In the insert section 64, the previous state is null since the cache line is being filled into the cache 32. For this section, request types other than non-temporal (NT) demand requests update the replacement data to make the fill the MRU for critical cache lines. If the fill is for a prefetch request (data or instruction) and the criticality value is non-critical status, the fill is made LRU position N, which is near the LRU position but not the LRU position itself. For example, N may be above the LRU by approximately 25% of the distance between the LRU and the MRU. If, for example, the cache 32 is 8 ways, 25% above the LRU would be 2 positions above the LRU. If the cache 32 is 16 ways, 25% of above the LRU would be 4 positions above the LRU. If the fill is for a demand fetch (instruction or data) and the criticality value is non-critical status, the fill is made LRU position L (near the middle of the replacement data range). For example, if the cache 32 is 8 ways, L may be in the range of positions 4 to 6 in various embodiments, assuming the LRU position is numbered 0. If the cache is 16 ways, L may be in the range of 6 to 8. If the fill is for an NT demand fetch, the LRU position of the fill may be position M, near the LRU but less than N.

In the embodiment of FIG. 3, the update of the replacement data on a hit to a cache line may be independent of the criticality value of the cache line. Other embodiments may consider criticality in the update. If the hitting request is a demand fetch (instruction or data) and the cache line was a prefetched cache line, the LRU position may be unchanged (NC), but the prefetch tracking bit may be unset for the cache line so the next time the cache line is hit, it will be a demand fetch. If the hitting request is a demand fetch (instruction or data) and the hit cache line was an NT demand or a demand fetch (instruction or data), the hitting cache line maybe made MRU. If the hitting request is a data prefetch, the hit cache line may be placed at N (near the LRU). If the hitting request is an instruction prefetch, the hit cache line be made the MRU. If the hitting request is an NT demand, the hit cache may be position N.

Turning now to FIG. 4, a flowchart is shown illustrating operation of one embodiment of the criticality control circuit 34 to select a victim cache line to be evicted when a cache miss is detected. While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 4.

If there is at least one invalid cache entry in the set indexed by the cache miss (decision block 70, "yes" leg), the criticality control circuit 34 may select the LRU-most invalid entry (block 72). An invalid entry may be a cache line storage location (e.g., way) that is not currently storing a cache line. The LRU-most invalid entry may be the invalid entry that is invalid and that has a position closest to the LRU position in the replacement data when compared to the positions of the other invalid entries. The LRU-most invalid entry may be at the LRU position.

If there are no invalid entries in the set (decision block 70, "no" leg), the criticality control circuit 34 may select a valid entry as the victim. In a typical LRU policy, the LRU entry may be selected. However, in this embodiment, the criticality control circuit 34 may retain the critical cache lines with a certain probability. Accordingly, a biased pseudo-random selection may be generated (e.g., based a linear feedback shift register, or LFSR, and the desired probability) (block 74). Based on the pseudo-random selection, the criticality control circuit 34 may selectively mask the critical cache lines from being selected (block 76). For example, if the biased pseudo-random selection indicates one evaluation of the biased trial (e.g., "yes"), the critical cache lines may not be masked. If the biased pseudo-random value indicates another evaluation of the biased trial (e.g., "no"), the critical cache lines may be masked. This type of probability-base retention may also be referred to as a "biased coin flip." The criticality control circuit 34 may select the LRU-most valid, unmasked entry and may evict the cache block in that entry (block 78).

Figure 5:
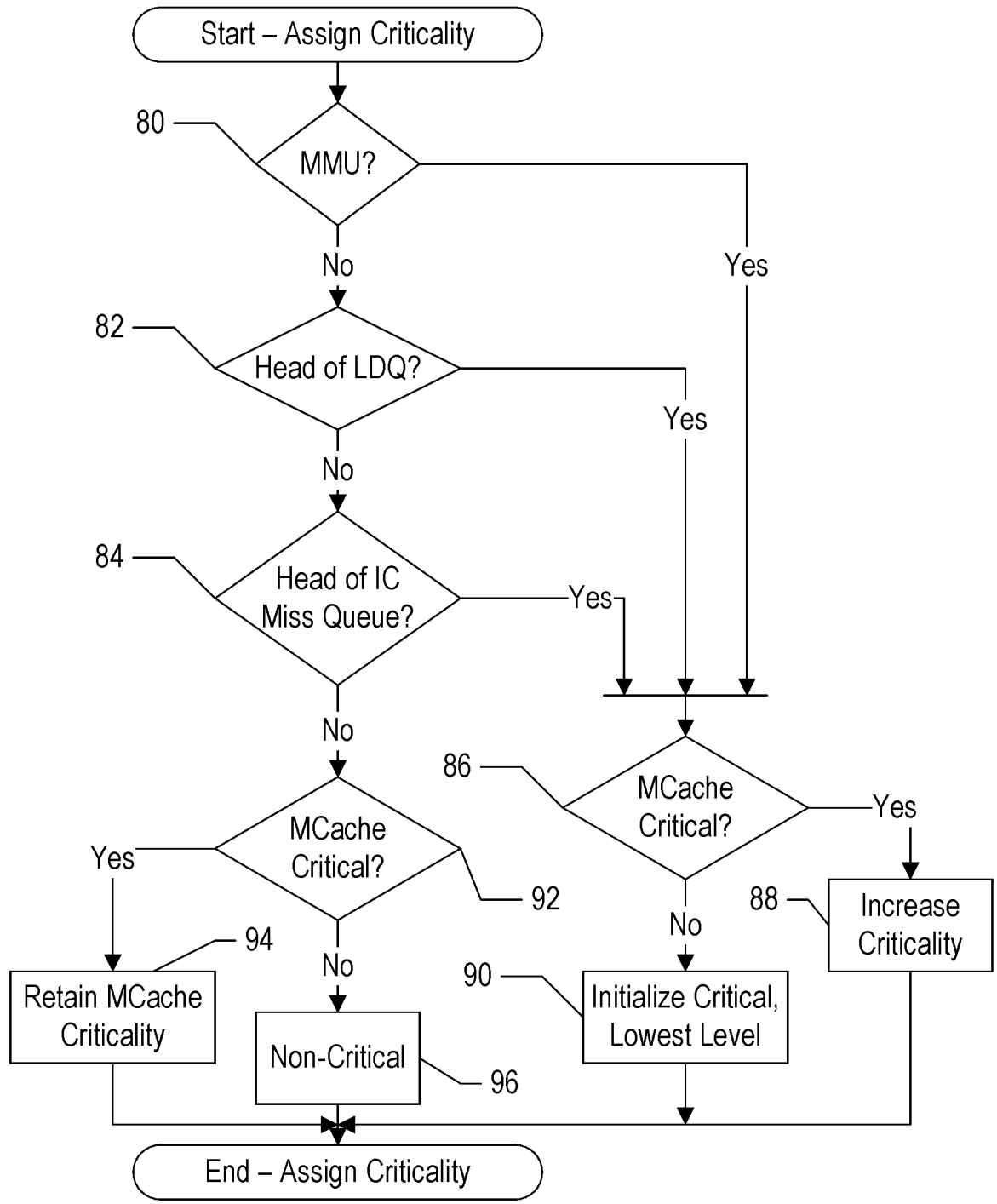
FIG. 5 is a flowchart illustrating criticality determination for another embodiment.

FIG. 5 is a flowchart illustrating operation of the criticality control circuit 34 for another embodiment of assigning a criticality for a cache line being filled into the LLC 14. While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 5.

Similar to the embodiment of FIG. 2, the cache line may be critical if the cache line is being filled as a result of an MMU tablewalk request (decision block 80, "yes" leg), a load at the head of the LDQ 26 (decision block 82, "yes" leg), or an instruction fetch at the head of the IC miss queue 22 (decision block 84, "yes" leg). In this embodiment, there are multiple levels of critical status. If the criticality supplied by the MCache 40 indicates critical status (decision block 86, "yes" leg), the criticality control circuit 34 may increase the level of critical status from the status provided by the MCache 40 (block 88). If the MCache 40 indicates non-critical (decision block 86, "no" leg), either the cache line was previously non-critical or the cache line was a miss in the MCache 40. In these cases, the criticality control circuit 34 may initialize the criticality value at the lowest of level of critical status (block 90).

If the cache line is not critical in the current fill (decision blocks 80, 82, and 84, "no" legs), but the criticality value provided by the MCache 40 is critical status (decision block 92, "yes" leg), the criticality control circuit 34 may retain the criticality value provided by the MCache 40 (block 94). Otherwise (decision block 92, "no" leg), the criticality control circuit 34 may initialize the criticality value with non-critical status (block 96).

Figure 6:
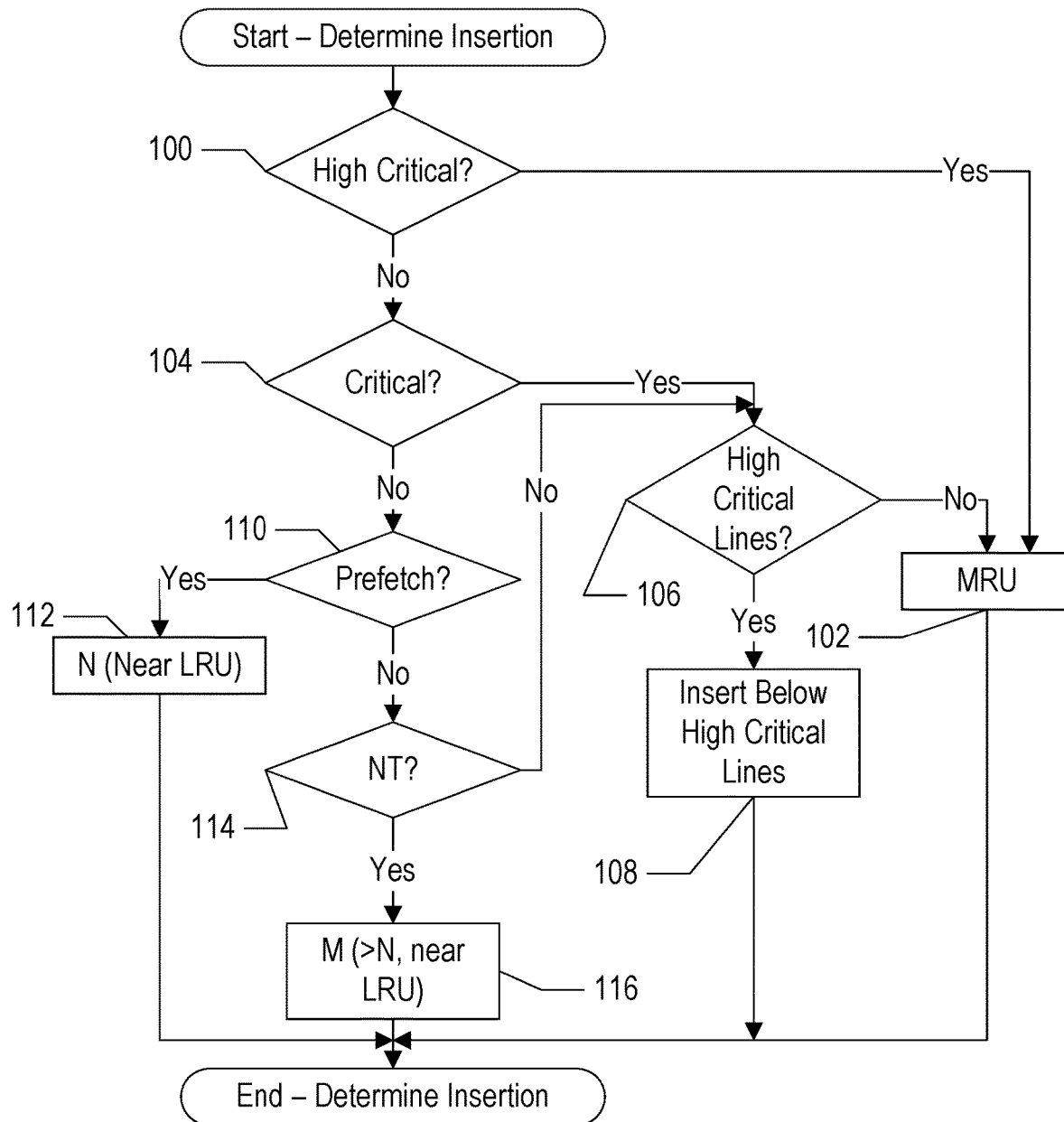
FIG. 6 is a flowchart illustrating LRU insertion in the LLC for one embodiment.

FIG. 6 is a flowchart illustrating operation of one embodiment of the criticality control circuit 34 to update the replacement data for a set based on a fill of a cache line into the cache 32 (an insertion of a cache line). While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 6.

If the cache line being filled has high critical status (e.g., critical status other than the lowest of the critical statuses, in an embodiment) (decision block 100, "yes" leg), the cache line may be inserted at the MRU position in the replacement data (block 102). If the cache line has critical status (e.g., the lowest critical status) (decision block 100, "no" leg and decision block 104, "yes" leg), the criticality control circuit 34 may be configured to insert the cache line in a position as high as possible in the replacement data (nearest the MRU), but below the positions of any high critical status cache lines. Thus, if there are one or more high critical cache lines in the replacement data (decision block 106, "yes" leg), the criticality control circuit 34 may insert the cache line at the highest position that is lower than the high critical cache lines (block 108). Otherwise, the cache line may be inserted at the MRU position (decision block 106, "no" leg and block 102).

If the cache line being filled in non-critical (decision blocks 100 and 104, "no" legs) and the fill is due to a prefetch (instruction or data) (decision block 110, "yes" leg), the prefetch may be inserted at N near the LRU (block 112) similar to the discussion above with regard to FIG. 3. In one embodiment, instruction prefetches may be placed at a lower LRU position the data prefetches, but both may be placed near the LRU position. Alternatively, instruction prefetches may be placed at a higher LRU position than data prefetches, but both near LRU, or the same LRU position may be used for both types of prefetches. If the non-critical cache line is not a prefetch but is an NT request (decision block 114, "yes" leg), the cache line may be inserted at position M, which in this embodiment is greater than N but near the LRU (block 116). If the non-critical cache line is a demand request (decision block 114, "no" leg) and there are any critical cache lines (decision block 106, "yes" leg), the non-critical cache line may be inserted below the critical cache lines (block 108). If there are no critical cache lines in the set (decision block 106, "no" leg), the non-critical cache line may be inserted at the MRU position (block 102).

The circuitry represented by decision block 106 and blocks 102 and 108 may provide a dynamic insertion point for certain cache lines, preventing a "priority inversion" in the replacement data if critical cache lines could be moved down the replacement data toward the LRU position by less critical cache lines.

Figure 7:
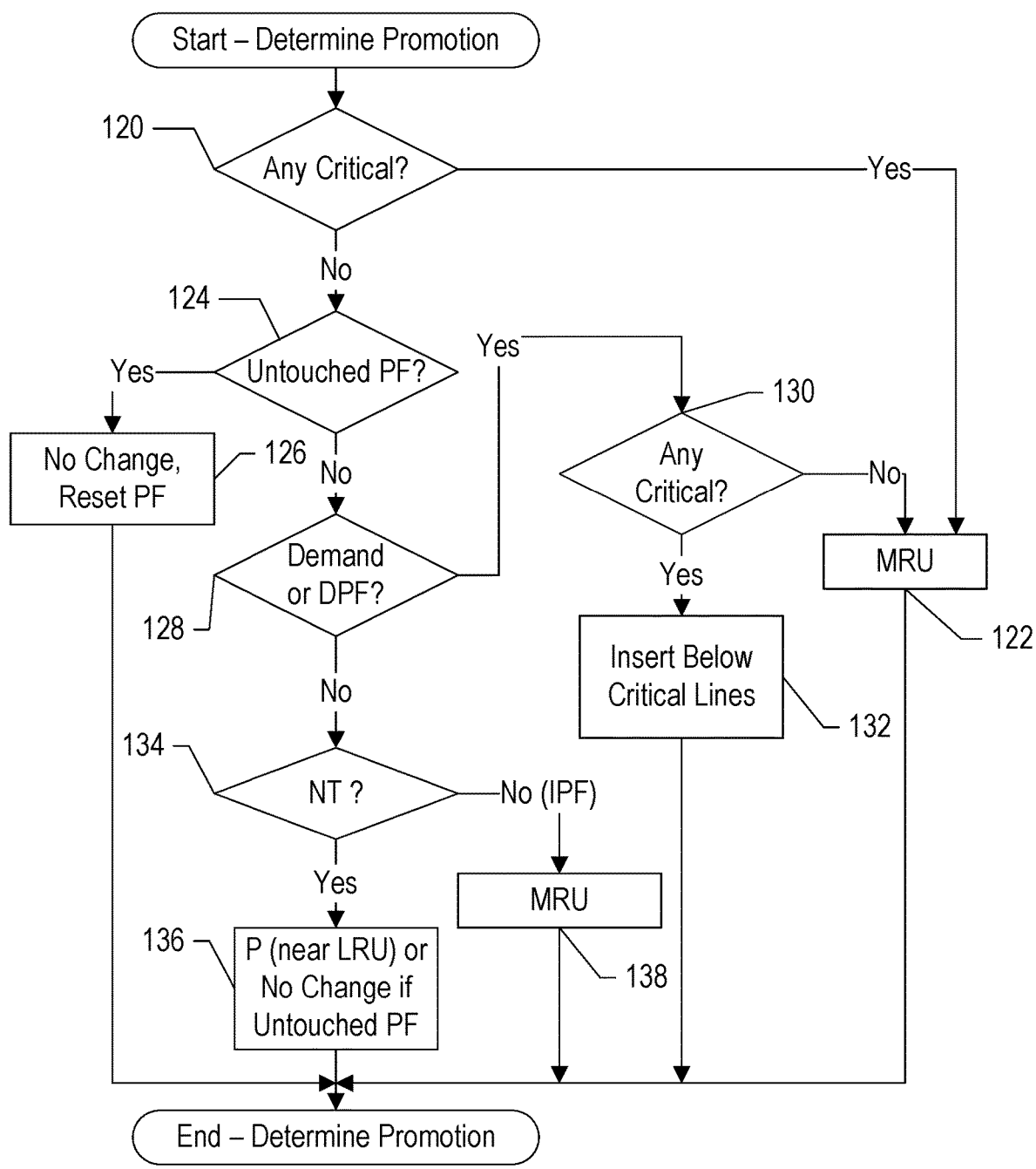
FIG. 7 is a flowchart illustrating LRU promotion in the LLC for one embodiment.

FIG. 7 is a flowchart illustrating operation of one embodiment of the criticality control circuit 34 to update the replacement data for a set based on a hit to a cache line into the criticality control circuit 34 (a promotion of a cache line). While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 7.

If the hit cache line has any level of critical status (decision block 120, "yes" leg), the criticality control circuit 34 may update the cache line to the MRU position (block 122). If the hit cache line is non-critical (decision block 120, "no" leg), and the hit cache line is an untouched prefetch request (decision block 124, "yes" leg), the criticality control circuit 34 may leave the replacement data position unchanged but may reset the prefetch bit (block 126). If the hitting request is a demand or data prefetch (decision block 128, "yes" leg), the criticality control circuit 34 may preserve the priority of the critical cache lines by promoting the hit cache line to the highest replacement data position that is below the critical cache lines (decision block 130, "yes" leg and block 132). If there are no critical cache lines in the set, the hit cache line may be made MRU (decision block 130, "no" leg and block 122). If the hitting request is an NT request (decision block 134, "yes" leg), the hit cache line may be updated to position P that is near the LRU, unless the hit cache line is an untouched prefetch in which case the position is unchanged (block 136). If the hitting request is not an NT request (nor the other types of requests mentioned above), the request may be an instruction prefetch and the hit cache line may be update to MRU (block 138).

Similar to the above discussion with regard to FIG. 6, the circuitry represented by the decision block 130 may provide a dynamic replacement data update to prevent priority inversion between non-critical cache lines and critical cache lines. The embodiment of FIG. 6 may allow different levels of critical cache lines to reorder in the replacement data, but may keep the non-critical cache lines below the critical cache lines in the replacement data.

Figure 8:
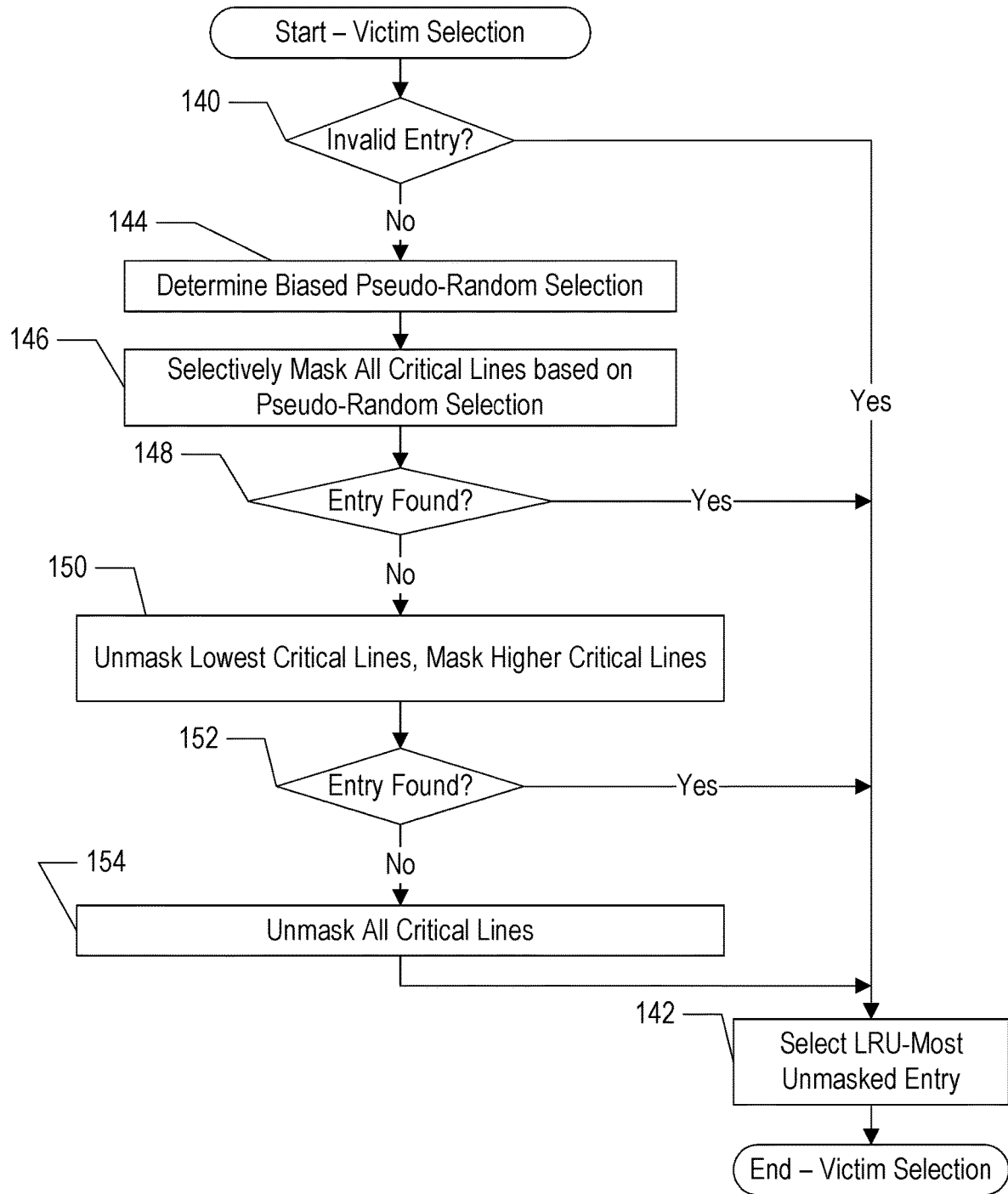
FIG. 8 is a flowchart illustrating victim selection for one embodiment.

Turning now to FIG. 8, a flowchart is shown illustrating operation of one embodiment of the criticality control circuit 34 to select a victim cache line to be evicted when a cache miss is detected. While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 8.

If there is at least one invalid entry in the set (decision block 140, "yes" leg), the criticality control circuit 34 may mask all the valid entries and select the LRU-most unmasked (invalid) entry (block 142). If all entries are valid (decision block 140, "no" leg), the criticality control circuit 34 may determine a biased pseudo-random selection, similar to the discussion above with regard to FIG. 4 (block 144). Based on the pseudo-random selection, the criticality control circuit 34 may selectively mask all critical cache lines (block 146). If at least one unmasked, valid entry is found (decision block 148, "yes" leg), the criticality control circuit 34 may select the LRU-most unmasked entry (block 142). If no entry is found (decision block 148, "no" leg), the criticality control circuit 34 may unmask the lowest level of critical cache lines while still masking the higher critical cache lines (block 150). If at least one unmasked, valid entry is found (decision block 152, "yes" leg), the criticality control circuit 34 may select the LRU-most unmasked entry (block 142). If no entry is found (decision block 152, "no" leg), the criticality control circuit 34 may unmask all critical cache lines (block 154), and may select the LRU-most unmasked entry (block 142).

Figure 9:
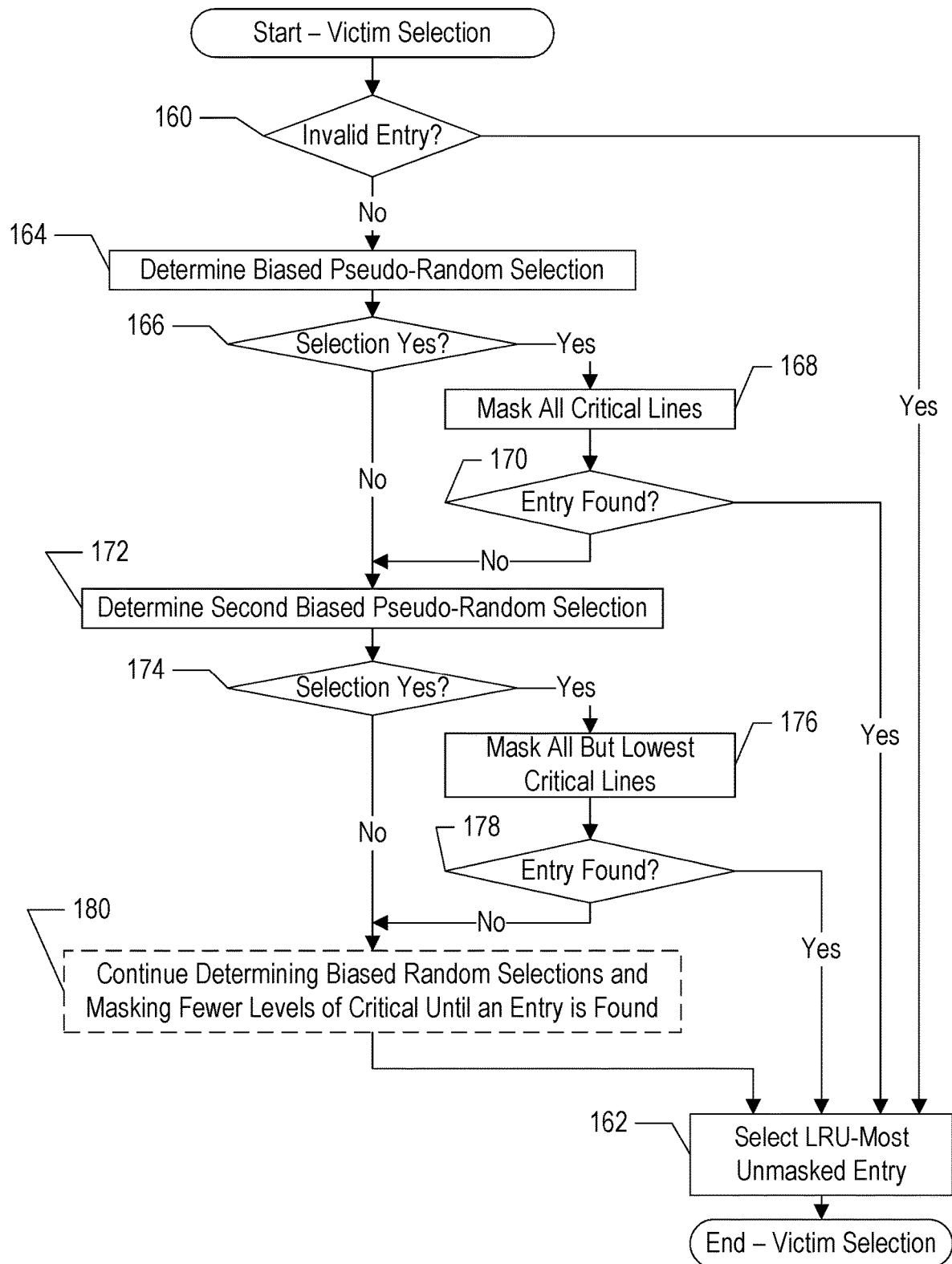
FIG. 9 is a flowchart illustrating victim selection for another embodiment.

FIG. 9 is a flowchart illustrating operation of another embodiment of the criticality control circuit 34 to select a victim cache line to be evicted when a cache miss is detected. While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 9.

The embodiment of FIG. 9 may employ multiple biased pseudo-random selections based on different probabilities to selectively mask or not mask various subsets of the critical status until a victim is selected. Similar to the embodiment of FIG. 8, if there is at least one invalid entry in the set (decision block 160, "yes" leg), the criticality control circuit 34 may mask all the valid entries and select the LRU-most unmasked (invalid) entry (block 162). If all entries are valid (decision block 160, "no" leg), the criticality control circuit 34 may determine a first biased pseudo-random selection based on a first probability, similar to the discussion above with regard to FIG. 4 (block 164). If the selection is yes (decision block 168, "yes" leg), the criticality control circuit 34 may mask all critical cache lines (block 168) and determine if at least one valid, unmasked entry is found (decision block 170). If so (decision block 170, "yes" leg), the criticality control circuit 34 may select the LRU-most unmasked entry (block 162). If not (decision block 170, "no" leg) or if the selection was no (decision block 166, "no" leg), the criticality control circuit 34 may determine a second biased pseudo-random selection based on a second probability (block 172). If the selection is yes (decision block 174, "yes" leg), the criticality control circuit 34 may mask critical cache lines except for the lowest critical status (block 176) and determine if at least one valid, unmasked entry is found (decision block 178). If so (decision block 178, "yes" leg), the criticality control circuit 34 may select the LRU-most unmasked entry (block 162). If not (decision block 178, "no" leg) or if the selection was no (decision block 174, "no" leg), the criticality control circuit 34 may continue with similar iterations, masking fewer of the highest levels of critical status, until an entry is found (block 180) or until all critical lines are not masked. Once an entry is found, the criticality control circuit may select the LRU-most unmasked entry (block 162).

Embodiments that implement the dynamic replacement data updates to preferentially retain critical cache lines nearer the MRU than other cache lines may successfully retain the cache lines in the LLC 14. However, once the critical cache lines are no longer useful, the same properties may increase the difficulty of replacing the critical cache lines with more recently accessed cache lines that are not critical.

As mentioned above, during selection of a victim cache line for replacement, the LLC 14 may be configured to preferentially retain cache lines identified as critical by the corresponding criticality values over cache lines not identified as critical. The LLC 14 may be configured to select the victim cache line according to replacement data maintained by the cache separate from the criticality values (and taking into account the criticality values as well). However, when the criticality control circuit 34 detects one or more indications that at least some of the cache lines identified as critical are no longer critical, the criticality control circuit 34 may be configured to terminate the preferential retention of the cache lines based on the one or more indications. Viewed in another way, the criticality control circuit 34 may accelerate eviction of the cache lines identified as critical based on the one or more indications (as compared to the retention that would be applied prior to detecting the one or more indications). For example, in an embodiment, the criticality control circuit 34 may be configured to ignore the criticality values when selecting the victim cache line to terminate the preferential retention, or to accelerate the eviction, of the critical cache lines.

FIG. 10 is a flowchart illustrating operation of one embodiment of the criticality control circuit 34 to accelerate the eviction of critical cache lines that are no longer being used. While the blocks are shown in a particular order for ease of understanding, other orders may be used. Blocks may be performed in parallel in combinatorial logic in the criticality control circuit 34. Blocks, combinations of blocks, and/or the flowchart as a whole may be pipelined over multiple clock cycles. The criticality control circuit 34 may be configured to implement the operation shown in FIG. 10.

If critical cache lines are not being accessed any longer (e.g., the accessing thread or threads have completed execution), the critical cache lines may eventually migrate toward the LRU position in the replacement data. Accordingly, the criticality control circuit 34 may monitor the hit rates for critical cache lines that are in the N-most LRU positions (block 190). N maybe selected in any desired fashion. For example, N may be about one quarter of the number of ways in a set. Additionally, if snoop copy backs of cache lines from the LLC 14 are increasing (that is, snoops are causing the cache lines to be forwarded to another Processor 10A-10N), the thread that was accessing the critical cache lines may have migrated to a different cluster of processors 10A-10N coupled to a different LLC 14 in the system (not shown in FIG. 1). Accordingly, the criticality control circuit 34 may monitor snoop rates that cause cache lines to be forwarded to other agents in the system (not back to the memory controller 16) (block 192). The criticality control circuit 34 may monitor for snoop forwards of critical cache blocks only, or all cache blocks, in various embodiments. Another factor that may be monitored is inferred coprocessor requests (requests from the coprocessor 12) (block 194).

If the cache hit rates detected via the monitoring represented by block 190 are less than a threshold (decision block 196, "yes" leg), the criticality control circuit 34 may ignore the criticality values in victim selection and LRU insertion and promotion (block 198). Thus, the cache lines may be treated the same, regardless of critical/non-critical status. Similarly, if snoop forward rates are occurring above a threshold (decision block 200, "yes" leg), the criticality control circuit 34 may ignore the criticality values in victim selection and LRU insertion and promotion (block 198). If inferred coprocessor requests are increasing (decision block 202, "yes" leg), the criticality control circuit 34 may ignore the criticality values in victim selection and LRU insertion and promotion (block 198).

Another factor that may be used is if the capacity in the MCache 40 that is available for the processors 10A-10N/LLC 14 drops below a threshold (e.g., as indicated by the Capacity_CPU indication from the monitor circuit 42) (decision block 204, "yes" leg, the criticality control circuit 34 treat all levels of critical status as the lowest critical status (block 206). If none of the above is true (decision blocks 196, 200, 202, and 204, "no" legs), the criticality control circuit 34 may maintain the use of criticality values in victim selection and LRU insertion and promotion (block 208).

Thus, in this embodiment the one or more indications may include a cache hit rate below a threshold level for cache lines in a plurality of least recently used positions in the replacement data and having criticality values indicating critical status. The one or more indications may include a rate at which snoop hits in the cache occur and cause a forward of a corresponding cache line in response to the snoop hit being above a threshold level. In systems that comprise a coprocessor coupled to the cache and configured to execute coprocessor instructions issued to the coprocessor by the one or more processors, the one or more indications may comprise memory requests issued by the coprocessor to the cache. The criticality control circuit 34 may be configured to infer the coprocessor memory requests based on prefetch requests generated by the one or more processors that are indicated as coprocessor prefetch requests. Also as mentioned above, the MCache 40 may provide an indication of capacity in the second cache that is allocable to data from the LLC 14, and the control circuit is configured to override the plurality of levels of criticality with a lowest one of the plurality of levels of criticality based on the indication of capacity being lower than a threshold.

In an embodiment, a method may comprise: assigning criticality values to cache lines in a cache, wherein a given criticality value corresponds to a given cache line; during selection of a victim cache line for replacement, preferentially retaining cache lines identified as critical by the corresponding criticality values over cache lines not identified as critical, wherein the selection is further based on replacement data maintained by the cache separate from the criticality values; detecting one or more indications that at least some of the cache lines identified as critical are no longer critical; and ignoring the criticality values for victim selection and replacement data update based on the one or more indications. For example, in one embodiment, the method further comprises monitoring a cache hit rate for cache lines in a plurality of least recently used positions in the replacement data and having criticality values indicating critical status, and one of the one or more indications is based on the cache hit rate being below a threshold level. In an embodiment, the method further comprises monitoring a rate at which snoop hits in the cache occur and cause a forward of a corresponding cache line in response to the snoop hit, and one of the one or more indications is based on the snoop hit rate being above a threshold level. In an embodiment, the one or more indications comprise memory requests issued by a coprocessor to the cache, wherein the coprocessor is coupled to the cache and is configured to execute coprocessor instructions issued to the coprocessor by one or more processors. The method may further comprise inferring the coprocessor memory requests based on prefetch requests generated by one or more processors that are indicated as coprocessor prefetch requests. The method may further comprise, in an embodiment, providing an indication from a second cache of capacity in the second cache that is allocable to data from the cache, wherein the criticality values indicate non-critical and a plurality of levels of criticality; and overriding the plurality of levels of criticality with a lowest one of the plurality of levels of criticality based on the indication of capacity being lower than a threshold.

FIG. 11 is a flowchart illustrating operation of one embodiment of the criticality control circuit 34 and the MCache 40 for inserting evicted cache lines from the LLC 14 into the MCache 40 replacement data. While the blocks are shown in a particular order for ease of understanding, other orders may be used. Blocks may be performed in parallel in combinatorial logic in the criticality control circuit 34 and/or MCache 40. Blocks, combinations of blocks, and/or the flowchart as a whole may be pipelined over multiple clock cycles. The criticality control circuit 34/MCache 40 may be configured to implement the operation shown in FIG. 11.

If the evicted cache line is a critical cache line (decision block 210, "yes" leg), the criticality control circuit 34 may generate the insert hint to the MCache 40 to insert the cache line at the MRU position (block 212). Alternatively, the MCache 40 may detect the critical status of the cache line and insert the cache line at the MRU position. If the cache line is non-critical (decision block 210, "no" leg), the criticality control circuit 34 may generate and index to the MCache insert LUT 36 based on the Capacity_CPU telemetry data (block 214). For example, the Capacity_CPU telemetry data may indicate the average number of ways of the MCache 40 that are available for cache lines from the processors 10A-10N/LLC 14. The index may be generated based on the average number of ways being in various ranges. For example, up to one eighth of the number of ways, one eighth to one fourth of the number of ways, one fourth to one half of the number of ways and more than one half of the number of ways may be the index for a two bit insert hint. The criticality control circuit 34 may generate the insert hint from the indexed entry in the MCache insertion LUT 36 (block 216).

When the insert control circuit and LUT 38 receives the evicted cache block, the insert hint may be used as an index to the LUT 38, and the insert position may be read from the table (block 218). The insert control circuit 38 may modify the insert position based on whether or not MCache ways are powered down for power conservation. That is, each powered down way occupies an LRU position in the replacement data, since it cannot be used. If the insert position would be in one of the N LRU positions, where N is the number of powered down ways, the insert position may be increased to N (block 220). The MCache 40 may allocate an entry for the cache line and update the entry with the cache line (block 222), writing the cache line evicted form the MCache 40, if any, to the memory 18 if it is modified with respect to the copy in the memory 18. The MCache 40 may update the replacement data to indicate the allocated entry at the insert position (block 224).

In an embodiment, the MCache 40 may also support a dynamic insertion position for non-critical cache lines from the processors 10A-10N/LLC 14. For example, the MCache 40 may determine the MRU-most non-critical cache line (not including the cache line for which the insertion point is detected), referred to in this paragraph as position H. If there are no non-critical cache lines, the MCache 40 may insert the cache line at the adjusted insert position described in the preceding paragraph. However, if there are valid non-critical cache lines in the MCache 40 and the cache line being inserted is already at a more-MRU position than position H, then the MCache 40 may insert the cache line may at the position one closer to the MRU than position H. Otherwise, the MCache 40 may insert the cache line at position H. The MCache 40 may update the replacement data to indicate the allocated entry at the insert position (block 224).

Figure 12:
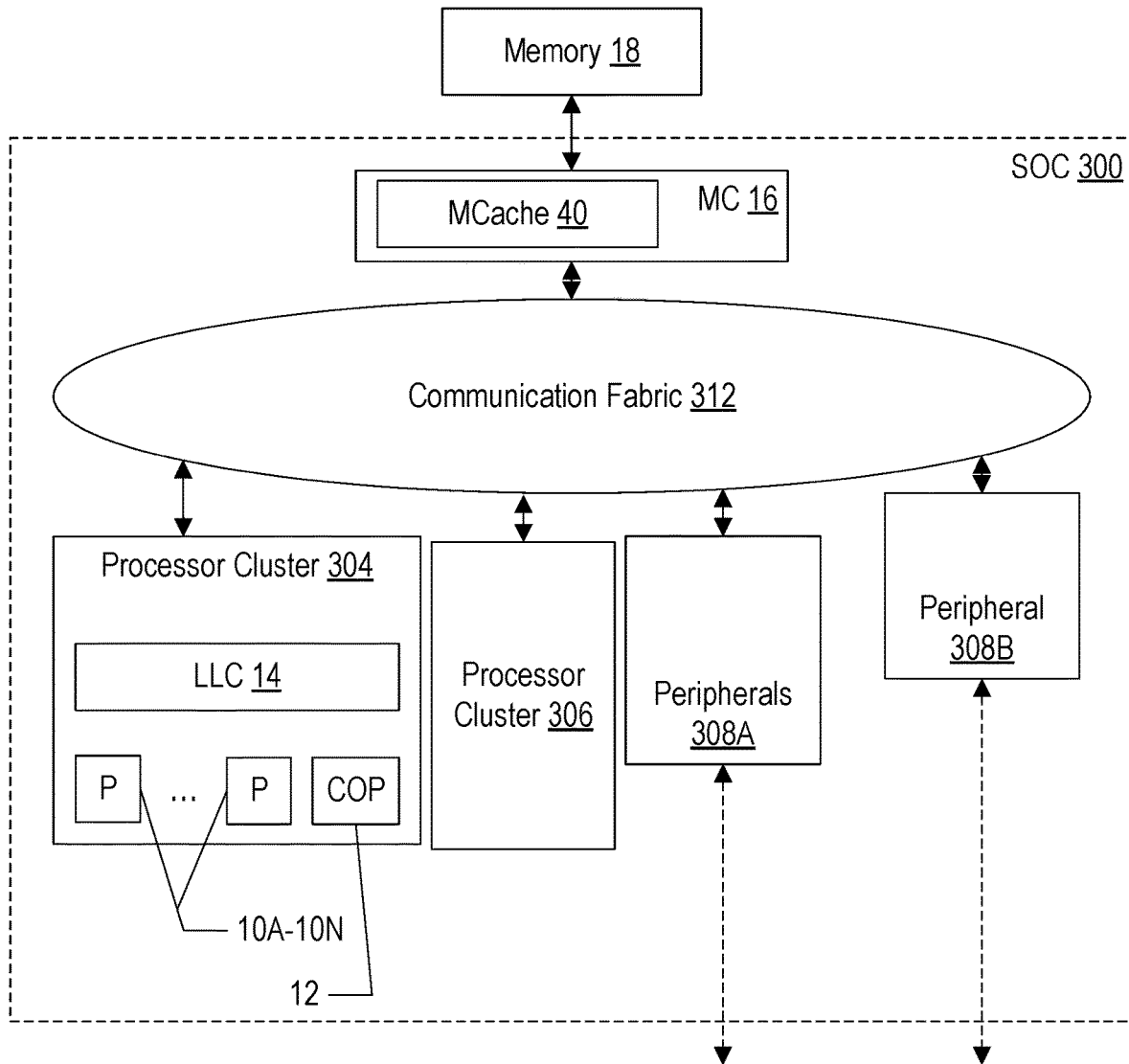
FIG. 12 is a block diagram of one embodiment of a system on a chip (SOC).

FIG. 12 is a block diagram of one embodiment of a system that includes a system on a chip (SOC) 300 coupled to a memory 18. As implied by the name, the components of the SOC 300 may be integrated onto a single semiconductor substrate as an integrated circuit "chip." In the illustrated embodiment, the components of the SOC 300 include a processor cluster 304, another processor cluster 206 one or more peripheral components such as peripheral components 308A-308B (more briefly, "peripherals"), the memory controller 16 and a communication fabric 312. The components 304, 306, 308A-308B, and 16 may all be coupled to the communication fabric 312. The memory controller 16 may be coupled to the memory 18 during use. In some embodiments, there may be more than one memory controller coupled to a corresponding memory. The memory address space may be mapped across the memory controllers in any desired fashion in such embodiments. In the illustrated embodiment, the processor cluster 304 may include a plurality of processors (P) 10A-10N. The processors 10A-10N may form the central processing units (CPU(s)) of the SOC 300. The processor cluster 304 may further include one or more coprocessors (e.g., the coprocessor 12 in FIG. 12). The processor cluster 304 may further include the LLC 14. The processor cluster 306 may be similar to the processor cluster 304. Thus, the SOC 300 may be an implementation of the system shown in FIG. 1.

The memory controller 16 may generally include the circuitry for receiving memory operations from the other components of the SOC 300 and for accessing the memory 18 to complete the memory operations. The memory controller 12 may be configured to access any type of memory 18. For example, the memory 18 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 16 may include queues for memory operations, for ordering (and potentially reordering) the operations and presenting the operations to the memory 18. The memory controller 16 may further include data buffers to store write data awaiting write to memory and read data awaiting return to the source of the memory operation. In some embodiments, the memory controller 16 may include the memory cache (MCache) 40 to store recently accessed memory data. In SOC implementations, for example, the MCache 40 may reduce power consumption in the SOC by avoiding reaccess of data from the memory 16 if it is expected to be accessed again soon. In some cases, the MCache 40 may also be referred to as a system cache, as opposed to private caches such as the LLC 14 or caches in the processors 10A-10N, which serve only certain components. Additionally, in some embodiments, a system cache need not be located within the memory controller 16.

The peripherals 308A-308B may be any set of additional hardware functionality included in the SOC 300. For example, the peripherals 308A-308B may include video peripherals such as one or more graphics processing units (GPUs), an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 100 including interfaces such as Universal Serial Bus (USB), peripheral component interconnect (PCI) including PCI Express (PCIe), serial and parallel ports, etc. The interconnection to external device is illustrated by the dashed arrow in FIG. 12 that extends external to the SOC 300. The peripherals may include networking peripherals such as media access controllers (MACs). Any set of hardware may be included.

The communication fabric 312 may be any communication interconnect and protocol for communicating among the components of the SOC 300. The communication fabric 312 may be bus-based, including shared bus configurations, cross bar configurations, and hierarchical buses with bridges. The communication fabric 312 may also be packet-based, and may be hierarchical with bridges, cross bar, point-to-point, or other interconnects.

It is noted that the number of components of the SOC 300 (and the number of subcomponents for those shown in FIG. 12, such as the processors 10A-10N in each processor cluster 304 and 306 may vary from embodiment to embodiment. Additionally, the number of processors 10A-10N in one processor cluster 304 may differ from the number of processors 10A-10N in the other processor cluster 306. There may be more or fewer of each component/subcomponent than the number shown in FIG. 12.

Based on the foregoing, in an embodiment, a system may comprise one or more processors configured to issue memory requests to access a memory system; and a cache coupled to the one or more processors and configured to cache data from the memory system for access by the one or more processors. The cache may comprise a control circuit configured assign criticality values to cache lines based on a plurality of factors at a time the cache lines are filled into the cache. During the fill of a given cache line, the control circuit may be configured to represent a given cache line at a selected position in replacement data for the cache based on the criticality value assigned to the given cache line. The control circuit may be configured to select a victim cache line to be evicted from the cache based on the replacement data. The control circuit may be configured to selectively prevent cache lines having criticality values indicating a critical status from selection as the victim cache line based on a probability.

In an embodiment, the system further comprises a second cache coupled to the cache and configured to cache data from the memory system for the cache and for one or more other cache-accessing agents in the system. The second cache is configured to store the victim cache line and to retain an indication of the criticality value assigned to the victim cache line by the control circuit. In an embodiment, the system further comprises a memory controller configured to control one or more memory devices forming at least a portion of the system memory, and the memory controller includes the second cache. In an embodiment, the second cache may be configured to provide the criticality value with the victim cache line in a fill to the cache based on another memory request that occurs subsequent to the eviction of the victim cache line from the cache. In an embodiment, the second cache is configured to maintain second replacement data; and the second cache may be configured to evict cache lines from the second cache based on the second replacement data. An initial position of the victim cache line in the second replacement data may be based on the criticality value. In an embodiment, the system comprises a monitor circuit coupled to the second cache and configured to provide an indication of capacity in the second cache that is allocable to data from the cache. The cache may be configured to generate an insertion hint to transmit with the victim cache line based on the indication of capacity. For example, the cache may comprise a table coupled to the control circuit that maps ranges of the indication of capacity to values for the insertion hint. In an embodiment, the second cache includes a second table. The second cache may be configured to select an entry in the second table based on the insertion hint. The second table may be configured to output an insertion point indication from the selected entry.

In an embodiment, the criticality status may include critical and non-critical. In one embodiment, the criticality status may further indicate one or more levels of criticality is assigned to a critical cache line.

In one embodiment, the control circuit may be configured to update the replacement data based on a request that hits on a second given cache line in the cache. The replacement data may be updated to move a position of a second entry storing the second given cache line nearer to a most recently accessed position based on the criticality value assigned to the second given cache line and the criticality values of other cache lines represented in the replacement data. For example, in the case that the criticality value assigned to the second given cache line is lower than the criticality values of one or more other cache lines represented in the replacement data, the control circuit may be configured to update the replacement data to represent the second given cache line at a second position below positions occupied by the one or more other cache lines.

In an embodiment, the control circuit is configured to monitor a cache hit rate for cache lines in a plurality of low positions in the replacement data and having criticality values indicating critical status. The control circuit may be configured to ignore the criticality values for victim selection and replacement data update based on the cache hit rate being below a threshold level. In an embodiment, the control circuit may be configured to monitor a snoop hit rate for snoops that cause cache lines to be forwarded from the cache. The control circuit may be configured to ignore the criticality values for victim selection and replacement data update based on the snoop hit rate exceeding a threshold level.

Computer System

Figure 13:
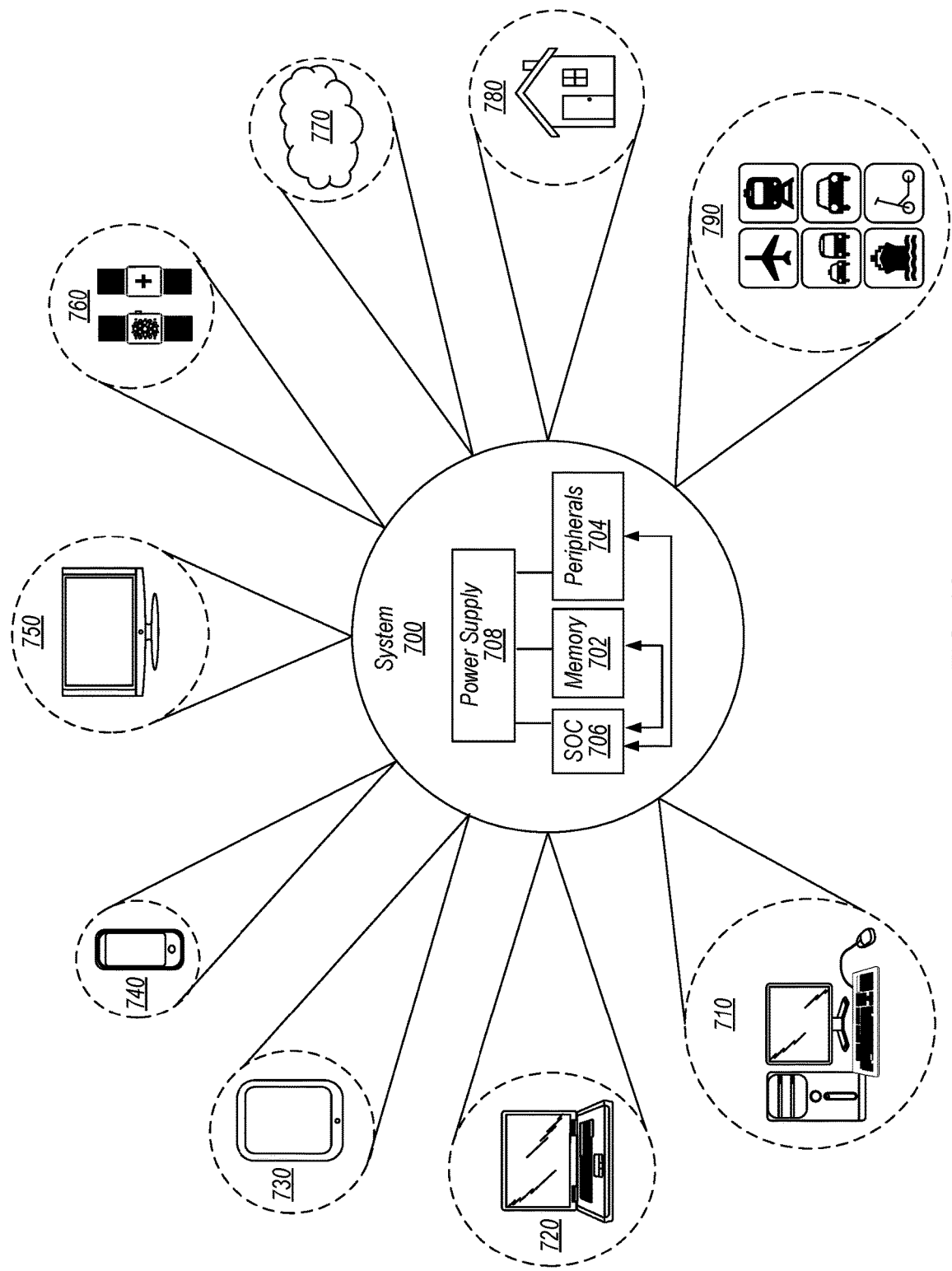
FIG. 13 is a block diagram of various embodiments of a computer system.

Turning next to FIG. 13, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC may be included (and more than one memory 702 may be included as well). The memory 702 may include the memory 18 illustrated in FIGS. 1 and 12, in an embodiment. The SOC 706 may be an instance of the SOC 300 illustrated in FIG. 12, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 13 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 13 are illustrative only and are not intended to be limiting. Other devices are possible and are contemplated.

Computer Readable Storage Medium

Figure 14:
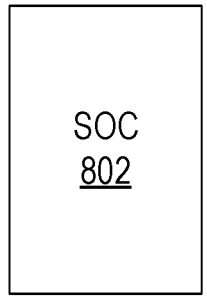
FIG. 14 is a block diagram of one embodiment of a computer accessible storage medium.

Turning now to FIG. 14, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 14 may store a database 804 representative of the SOC 300. Generally, the database 804 may be a database which can be read by a program and used, directly or indirectly, to fabricate the hardware comprising the SOC 300. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 300. The netlist may then be placed and routed to produce a data set describing geometric shapes to be applied to masks. The masks may then be used in various semiconductor fabrication steps to produce a semiconductor circuit or circuits corresponding to the SOC 300. Alternatively, the database 804 on the computer accessible storage medium 800 may be the netlist (with or without the synthesis library) or the data set, as desired.

While the computer accessible storage medium 800 stores a representation of the SOC 300, other embodiments may carry a representation of any portion of the SOC 100, as desired, including any subset of the components shown in FIG. 12. Furthermore, the database 804 may represent the processors 10A-10N, the coprocessor 12, or both as shown in FIG. 1, and may further represent the LLC 14 and/or the memory controller 16. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
one or more processors configured to issue memory requests to access a memory system; and
a cache coupled to the one or more processors and configured to cache data from the memory system for access by the one or more processors, wherein:
the cache comprises a control circuit configured to assign criticality values to cache lines based on a plurality of factors at a time the cache lines are filled into the cache;
during the fill of a given cache line, the control circuit is configured to represent a given cache line at a selected position in replacement data for the cache based on the criticality value assigned to the given cache line;
the control circuit is configured to select a victim cache line to be evicted from the cache based on the replacement data; and
the control circuit is configured to determine, according to a probability-based mode selection for a given cache eviction operation, whether to operate according to a first victim selection mode or a second victim selection mode, wherein the first victim selection mode prevents selection of cache lines having a critical status as a victim and the second victim selection mode allows selection of a cache line having a critical status as a victim.

2. The system as recited in claim 1 further comprising a second cache coupled to the cache and configured to cache data from the memory system for the cache and for one or more other cache-accessing agents in the system, wherein the second cache is configured to store the victim cache line and to retain an indication of the criticality value assigned to the victim cache line by the control circuit.

3. The system as recited in claim 2 further comprising a memory controller configured to control one or more memory devices forming at least a portion of the memory system, and wherein the memory controller includes the second cache.

4. The system as recited in claim 2 wherein the second cache is configured to provide the criticality value with the victim cache line in a fill to the cache based on another memory request that occurs subsequent to an eviction of the victim cache line from the cache.

5. The system as recited in claim 2 wherein the second cache is configured to maintain second replacement data, and wherein the second cache is configured to evict cache lines from the second cache based on the second replacement data, and wherein an initial position of the victim cache line in the second replacement data is based on the criticality value.

6. The system as recited in claim 5 further comprising a monitor circuit coupled to the second cache and configured to provide an indication of capacity in the second cache that is allocable to data from the cache, and wherein the cache is configured to generate an insertion hint to transmit with the victim cache line based on the indication of capacity.

7. The system as recited in claim 6 wherein the cache comprises a table coupled to the control circuit that maps ranges of the indication of capacity to values for the insertion hint.

8. The system as recited in claim 6 wherein the second cache includes a second table, and wherein the second cache is configured to select an entry in the second table based on the insertion hint, and wherein the second table is configured to output an insertion point indication from the selected entry.

9. The system as recited in claim 1 wherein the criticality values include critical and non-critical values.

10. The system as recited in claim 9 wherein the criticality values further indicate one of a plurality of levels of criticality is assigned to a critical cache line.

11. The system as recited in claim 1 wherein the control circuit is configured to update the replacement data based on a request that hits on a second given cache line in the cache, and wherein the replacement data is updated to move a position of a second entry storing the second given cache line nearer to a most recently accessed position based on the criticality value assigned to the second given cache line and the criticality values of other cache lines represented in the replacement data.

12. The system as recited in claim 11 wherein, in the case that the criticality value assigned to the second given cache line is lower than the criticality values of one or more other cache lines represented in the replacement data, the control circuit is configured to update the replacement data to represent the second given cache line at a second position below positions occupied by the one or more other cache lines.

13. The system as recited in claim 1 wherein the control circuit is configured to monitor a cache hit rate for cache lines in a plurality of low positions in the replacement data and having criticality values indicating critical status, and wherein the control circuit is configured to ignore the criticality values for victim selection and replacement data update based on the cache hit rate being below a threshold level.

14. The system as recited in claim 1 wherein the control circuit is configured to monitor a snoop hit rate for snoops that cause cache lines to be forwarded from the cache, and wherein the control circuit is configured to ignore the criticality values for victim selection and replacement data update based on the snoop hit rate exceeding a threshold level.

15. A method comprising:

assigning criticality values to cache lines in a cache based on a plurality of factors at a time the cache lines are filled into the cache;

representing a given cache line at a selected position in replacement data for the cache during the fill of the given cache line based on the criticality value assigned to the given cache line; and selecting a victim cache line to be evicted from the cache based on the replacement data, including determining, according to a probability-based mode selection for a given cache eviction operation, whether to operate according to a first victim selection mode or a second victim selection mode, wherein the first victim selection mode prevents selection of cache lines having a critical status as a victim and the second victim selection mode allows selection of a cache line having a critical status as a victim.

16. The method as recited in claim 15 further comprising:

caching data from a memory system for the cache in a second cache coupled to the cache, including storing the victim cache line;

retaining an indication of the criticality value assigned to the victim cache line by the cache; and providing the criticality value with the victim cache line in a fill to the cache based on another memory request that occurs subsequent to an eviction of the victim cache line from the cache.

17. The method as recited in claim 16 further comprising:

maintaining second replacement data in the second cache, wherein the second cache is configured to evict cache lines from the second cache based on the second replacement data; and inserting the victim cache line at an initial position in the second replacement data based on the criticality value.

18. The method as recited in claim 15 wherein the criticality values include critical and non-critical values.

19. The method as recited in claim 18 wherein the criticality values further indicate one of a plurality of levels of criticality is assigned to a critical cache line.

20. A cache configured to cache data from a memory system for access by one or more processors, the cache comprising a control circuit, wherein:

the control circuit is configured to assign criticality values to cache lines based on a plurality of factors at a time the cache lines are filled into the cache;

during the fill of a given cache line, the control circuit is configured to represent a given cache line at a selected position in replacement data for the cache based on the criticality value assigned to the given cache line;

the control circuit is configured to select a victim cache line to be evicted from the cache based on the replacement data; and the control circuit is configured to determine, according to a probability-based mode selection for a given cache eviction operation, whether to operate according to a first victim selection mode or a second victim selection mode, wherein the first victim selection mode prevents selection of cache lines having a critical status as a victim and the second victim selection mode allows selection of a cache line having a critical status as a victim.

* * * * *